United States Patent [19]
Jahr et al.

[11] Patent Number: 5,911,054
[45] Date of Patent: Jun. 8, 1999

[54] SINGLE-OPERATION LIST ENTRY UPDATE METHOD IN MIXED BUS ENVIRONMENTS

[75] Inventors: Steven J. Jahr, Granite Bay; Patrick A. Bueb, Auburn, both of Calif.

[73] Assignee: Hewlett Packaged Company, Palo Alto, Calif.

[21] Appl. No.: 08/841,247

[22] Filed: Apr. 29, 1997

[51] Int. Cl.⁶ .................................................. G06F 13/00
[52] U.S. Cl. ........................... 395/307; 395/306; 395/308
[58] Field of Search ................................... 395/307, 308, 395/306

[56] References Cited

U.S. PATENT DOCUMENTS

| | | | |
|---|---|---|---|
| 5,157,620 | 10/1992 | Shaar | 364/578 |
| 5,200,959 | 4/1993 | Gross et al. | 371/21.6 |
| 5,463,772 | 10/1995 | Thompson et al. | 395/281 |
| 5,644,784 | 7/1997 | Peek | 395/844 |

*Primary Examiner*—Ayaz R. Sheikh
*Assistant Examiner*—Ario Etienne

[57] ABSTRACT

Atomic list insertion is provided for multi-master bus operation where masters use different sized bus transactions that require special management techniques to prevent interleaved accesses from returning invalid data. The update of a list entry. Next field is made an atomic operation, where atomic is defined as indivisible. To this end, the list entry. Next field is subdivided into two parts and a terminator list entry is provided.

27 Claims, 1 Drawing Sheet

SINGLE-OPERATION LIST ENTRY UPDATE METHOD IN MIXED BUS ENVIRONMENTS

BACKGROUND OF THE INVENTION

1. Technical Field

The invention relates to a computer bus architecture. More particularly, the invention relates to multi-master bus operation where bus masters use different sized transactions in a list-based task communications scheme.

2. Description of the Prior Art

A typical computer bus architecture, i.e. one that includes multiple bus masters which have differing bus sizes and that use a list-based task communications scheme, is shown in FIG. 1. For purposes of the discussion herein, a bus "master" shall mean a system element that is capable of asserting control of the system bus, e.g. for purposes of memory access. A multiple bus master architecture includes two or more such bus masters. The computer bus architecture 10 shown in FIG. 1 includes the following features:

Bus cycle conversion between a 32-bit bus 12 and a 16-bit bus 13 is performed by the bus bridge 16 (which, in this example, is a PCI bus bridge).

Access to a shared system RAM 15 by the bus bridge 16 is arbitrated through direct memory access (DMA) protocols and thus interleaved with accesses to the shared system RAM 15 by a microprocessor 14 (which, in this example, is an m68000 microprocessor, manufactured by Motorola Corp. of Schaumburg, Ill.). The microprocessor 14 communicates with an I/O controller 17 (which, in this example, is an Ethernet controller) directly through the bus bridge 16, as well as indirectly through shared data stored in the shared system RAM 15 (explained in greater detail below).

The 16/32 bit microprocessor 14 accesses 32-bit data by using multiple 16-bit bus cycles, which may be interrupted mid-transaction by DMA bus cycles.

Note that while not shown in this figure, other elements may also be present in the overall system. These other elements are generally inconsequential to the discussion herein, except to note that they do exist and occupy system address space.

The environment shown in FIG. 1 is further defined by the presence of a list-based I/O controller task communications scheme, as shown in FIG. 2. The list based task communications scheme 20 shown in FIG. 2 includes the following features:

Each list entry 22, 23, 24 comprises a self-contained task to be performed by the I/O controller 17. There may be additional arbitrary list entry fields as needed. For example, in Ethernet controller each list entry can correspond to a buffer into which a local area network data packet may be received.

Each list entry provides a linkage (shown as "Next" 25, 26 in FIG. 2) to the next list entry to process in order. The last list entry provides a NULL linkage 27 (i e., a link having a value of zero) to signify the end of the list. The list entry linkages are usually memory address pointers into the shared system RAM.

The microprocessor builds lists of list entries and passes them to the I/O controller by writing the address of the first list entry in the list Into a CurrentListEntry control register 28. This write operation transfers ownership of the list entries to the I/O controller and initiates list processing.

Upon completion of processing each list entry, the I/O controller updates the status 29, 30, 31 of the list entry, thus passing control back to the microprocessor. The I/O controller then reads and follows the "Next" linkage to the next list entry and begins processing the next list entry. This process continues until the I/O controller comes to the end of the list, at which point it goes idle until it is restarted by the microprocessor, as discussed above.

Based upon the environment and operation described above, there are two traditional approaches to managing the I/O controller task lists. Unfortunately, both of these approaches have fundamental problems and limitations.

One approach to managing I/O controller task lists is to use a simple model, much as described above, in which the microprocessor builds complete lists of tasks/entries, passes these lists to the I/O controller, and then waits for all tasks/entries to be processed. This approach has the drawback that the I/O controller is unable to process system input/output information as long as it is idle. Factors which contribute to this idle latency include the detection of the completion of a final task/entry by the microprocessor, and processing overhead that is associated with passing a new list of tasks/entries from the microprocessor to the I/O controller. In some cases, this latency leads to unacceptable performance degradation, such as when high-speed input/output information is combined with a relatively slow microprocessor. For example, in the environment described above, which consists of an Ethernet I/O controller, LAN packets could be dropped, thereby causing relatively slow retransmission algorithms to be invoked.

Another approach to managing I/O controller task lists is to have the microprocessor dynamically add new tasks/entries to the end of the active list while the I/O controller is processing. This approach seems appealing because it can eliminate I/O controller idle time. However, based upon typical hardware architecture operation and I/O controller list processing (all as discussed above), errors can occur when the I/O controller reads invalid Next linkages.

The steps leading to this error include:

The microprocessor reads the status in last task/entry and determines that the I/O controller has not completed processing the task/entry. The microprocessor determines that there is a need to make a list addition and commits to making the list addition.

The microprocessor begins updating the 32-bit Next field in the list entry by writing the first 16-bits during a local (i.e. Non-bridged) 16-bit bus cycle.

The I/O controller completes processing the last task/entry and performs a read of the Next field using DMA interleaved access, superseding the microprocessor on the bus. The I/O controller reads the new data written (as described above) and old data not yet updated by the microprocessor. The result is that the overall 32-bit data value read by the I/O controller is invalid because the microprocessor has only written 16-bits of the 32-bit next field in the list entry of interest.

The microprocessor then completes updating the 32-bit Next field in the list entry by writing the last 16-bits in a local 16-bit bus cycle.

Detecting and recovering from I/O controller address errors is complex and can introduce undesirable I/O controller idle time latency and software overhead. For example, an I/O controller address error may lead to a system hang, at worst, or may require a reset and re-initialization of the I/O controller at a minimum.

It would be advantageous to provide a technique that eliminates problems associated with known approaches to task/entry processing without requiring the provision of additional hardware functionality.

SUMMARY OF THE INVENTION

The invention provides a system that substantially eliminates problems associated with known task/entry processing techniques, e.g. where an I/O controller is unable to process system input/output information while it is idle, and where errors occur because the I/O controller reads invalid Next linkages in a task entry list. The invention solves these problems without requiring the provision of additional hardware functionality by defining a new approach to managing the I/O controller task/entry list. In particular, the invention described herein solves list insertion problems associated with multi-master bus operation, where bus masters use different-sized bus transactions. The invention provides an approach that accomplishes this by providing management techniques which prevent interleaved accesses from returning invalid data. Thus, the invention provides a mechanism for task/entry list management that makes the update of a list entry Next field an atomic operation, where "atomic" is defined as indivisible. That is, a list/entry Next field update is accomplished in one operation, even where a 16-bit master (e.g. a 16-bit microprocessor) writes to a 32-bit Next field. Features of the invention that enable such improved management techniques include sub-dividing the list entry Next field into two parts, and the use of a terminator list

DETAILED DESCRIPTION OF THE INVENTION

The invention described herein solves various list insertion problems concerning multi-master bus operation. For example, the invention is readily applicable to environments in which bus masters use different sized bus transactions, and therefore require special management techniques to prevent interleaved accesses from returning invalid data.

This invention may be generalized to apply to list insertion in a broad range of environments by:

Processing the list entry Next field to generate a portion of the list entry Next field which has a fixed value for all list entries and a portion which is variant;

Scaling the variant portion of the list entry Next field to match the width of a local bus cycle; and Constraining all list entries such that they all are stored within a corresponding size block of address space as addressable by the variant portion of the list entry Next field.

Several examples are provided to explain the operation of the invention in certain specific environments. These examples use a 16-bit master operating with a 32-bit master, but can be generalized to other mixed size master operations as well. Accordingly, the invention is not limited to the environments described in the various examples, which follow.

The invention makes the update of a list entry Next field an atomic operation, where atomic is defined as indivisible. That is, a list entry Next field update is accomplished in one operation, or where a 16-bit master (e.g. A 16-bit microprocessor) writes to a 32-bit Next field. Features of the invention that enable such improved management techniques include sub-dividing the list entry Next field into two parts, and the use of a terminator list entry.

Figure 1:
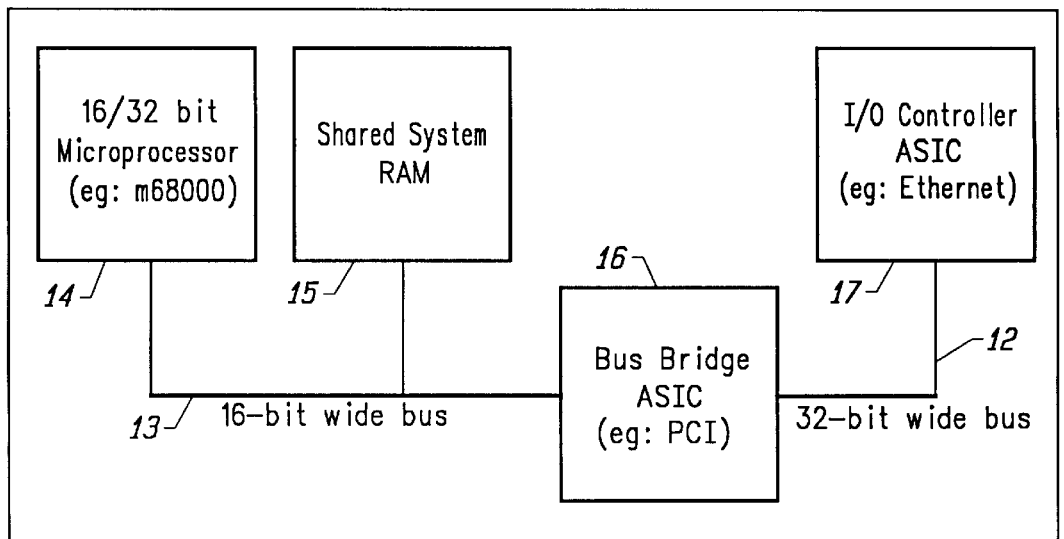
FIG. 1 is a block schematic diagram that provides an example of a typical computer bus architecture to which the invention herein may be applied.
Figure 2:
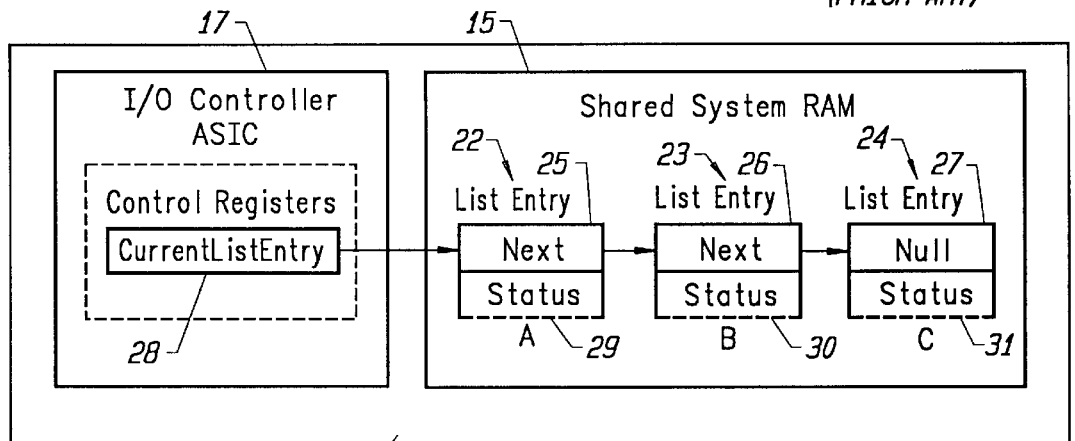
FIG. 2 is a block schematic diagram of a prior art list-based I/O controller task communications scheme.

With regard to the subdivision of the list entry Next field, consider an example where system addresses are 32 bits long and the list entry Next field is divided into high and low 16-bit words, e.g., in an environment having a 16-bit local bus width (See FIG. 1).

Table 1 below shows what the address of any list entry, and thus any corresponding list entry Next field, would be for various address ranges.

TABLE 1

| System Address Range | List Entry Address | List Entry Next High Word | List Entry Next Low Word |
| --- | --- | --- | --- |
| 0x00000000 0x0000FFFF | 0x0000???? | 0x0000 | 0x???? |
| 0x00010000 0x0001FFFF | 0x0001???? | 0x0001 | 0x???? |
| . . . | . . . | . . . | 0x???? |
| 0xFFFF0000 0xFFFFFFFF | 0xFFFF???? | 0xFFFF | 0x???? |

Note that within any of these ranges the high word of the list entry Next field remains fixed and only the low word varies. Thus, by constraining the list entries such that they all reside in the same 64 kB block of shared system RAM, it is possible to reduce the update of a list entry Next field to a single 16-bit write which can be performed with a single atomic bus operation which, in this example, occurs in an environment having a 16-bit bus width.

Note that the specific method used to locate all list entries in the same 64 kB block of shared system RAM is implementation dependent (they may naturally meet this location criterion with no additional processing). However, as long as all list entry addresses meet the following rule, they also meet this criterion:

(Address(First List Entry) & 0xFFFF0000)=(Address(All Other List Entries & 0xFFFF0000)

The details of memory allocation differ greatly between systems and implementations. Normally, the size of the list entry structure and the number of structures are both small enough that they naturally reside within the 64 kB limitation. A generic example is the following:

Alignment_pad=((64 * 1024)−1)

Alignment_mask=0XFFFF0000

Entry_space_needed=(sizeof(List_Entry) * Number_of_list_entries)

Address(First list entry)=malloc(Entry_space_needed+ Alignment_pad)

Address(First_List_Entry)=(Address(First_List_ Entry)+Alignment_pad) & Alignment_mask It should be appreciated that the foregoing example is generic. However, it is also highly inefficient, and those skilled in the art will appreciate that more efficient techniques are known, depending upon the application to which the invention is put.

The subdivision of the list entry Next field would be entirely sufficient to meet the objective of an atomic update if one were to constrain list entries further, such that they all reside in the first 64 kB block of system address space. Otherwise, the update of the NULL Next in the final list entry would require two bus cycles, thereby making the operation non-atomic. This approach, however, may not be possible because system elements, other than the shared system RAM, may occupy this region of system address space. This problem leads to a second feature of the invention, i.e., the use of a terminator list entry.

Figure 3:
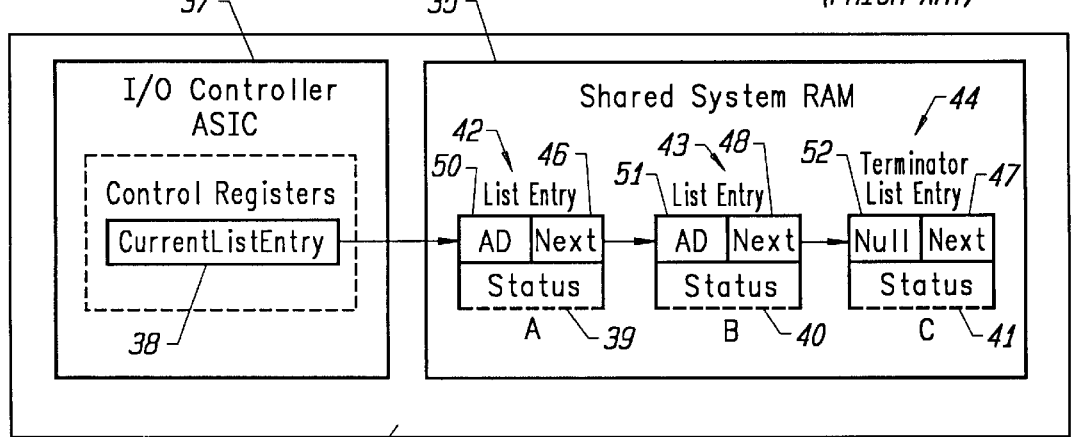
FIG. 3 is a block schematic diagram that illustrates a subdivided list entry Next field and a terminator list entry according to the invention.

FIG. 3 is a block schematic diagram that illustrates the fixed portion of the list entry Next field (shown as "AD" 50, 51) and the list entry 44.

The enhanced list-based communications scheme set forth herein is described below. The operations involved in such scheme are similar to those for list-based communications (as described above) with the following differences:

The high sub-part of the list entry Next field 50, 51 is pre-initialized in all list entries with the address of the terminator list entry, with the one exception of the terminator list entry, which is required by the I/O controller to be zero or null 52.

The microprocessor does not add to the actual end of the list. It instead inserts new list entries just before the list terminator entry 44. Thus, the Next field 46, 48 for all list additions ultimately links to the list terminator entry.

The microprocessor checks the status 40 of the list entry just prior to the terminator list entry through implementation dependent means (the last operative entry 43 in the example shown in FIG. 3). If this status 40 indicates that the list entry has not been processed by the I/O controller, then the microprocessor commits to list insertion.

The microprocessor writes the low subpart of the list entry Next field 46, 48 in the last operative entry 43 during a single bus cycle to establish a link to the new list entry.

The microprocessor validates proper list insertion by checking Status fields 39, 40, 41 in all List Entries. Under normal operation and proper list insertion the Terminator list entry is never processed by the I/O controller. However, the Terminator list entry must be a valid entry to allow it to be processed.

This invention may be generalized to list insertion in other environments by:

Scaling the variant portion of the List Entry Next field, to match the local bus width; and Constraining all List Entries to reside within a corresponding size block of address space as addressable by the variant portion of the List Entry Next field.

Although the invention is described herein with reference to the preferred embodiment, one skilled in the art will readily appreciate that other applications may be substituted for those set forth herein without departing from the spirit and scope of the invention. Accordingly, the invention should only be limited by the claims included below.

We claim:

1. A method for list insertion in mixed bus environments, comprising the steps of:

processing a list entry next field to generate a portion of said list entry next field which has a fixed value for all list entries and a portion which is variant; and constraining all said list entries such that they all are stored within a corresponding size block of address space as addressable by said variant portion of said list entry next field.

2. The method of claim 1, said constraining step further comprising the step of:

constraining said list entries such that they all are stored in a same block of shared system memory, wherein an update of a list entry next field is reduced to a single write operation that can be performed with a single atomic bus operation.

3. The method of claim 1, said constraining step further comprising the step of:

subdividing said list entry next field.

4. The method of claim 3, further comprising the step of:

pre-initializing a high sub-part of said list entry next field in all list entries to a common fixed value.

5. The method of claim 4, further comprising the step of:

providing a terminator list entry.

6. The method of claim 5, further comprising the step of:

inserting a new list entry just before said list terminator entry, wherein said next field for all list additions ultimately links to said terminator list entry.

7. The method of claim 6, further comprising the step of:

checking the status of a list entry positioned just prior to said terminator list entry.

8. The method of claim 7, further comprising the step of:

writing a low sub-part of said list entry next field in a last operative entry during a single bus cycle to establish a link to a new list entry.

9. The method of claim 8, further comprising the step of:

validating proper list insertion by checking status fields in all list entries.

10. A method for list insertion in mixed bus environments, comprising the steps of:

processing a list entry next field to generate a portion of said list entry next field which has a fixed value for all list entries and a portion which is variant; and scaling said variant portion of said list entry next field to match the width of a local bus cycle.

11. The method of claim 10, said scaling step comprising the step of:

constraining said list entries such that they all are stored in a same block of shared system memory, wherein an update of a list entry next field is reduced to a single write operation that can be performed with a single atomic bus operation.

12. The method of claim 11, said scaling step comprising the step of:

subdividing said list entry next field.

13. The method of claim 10, further comprising the step of:

pre-initializing a high sub-part of said list entry next field in all list entries except for a terminator list entry to a common fixed value.

14. The method of claim 13, further comprising the step of:

inserting a new list entry just before said list terminator entry, wherein said next field for all list additions ultimately links to said terminator list entry.

15. The method of claim 14, further comprising the step of:

checking the status of a list entry positioned just prior to said terminator list entry.

16. The method of claim 15, further comprising the step of:

writing a low sub-part of said list entry next field in a last operative entry during a single bus cycle to establish a link to a new list entry.

17. The method of claim 16, further comprising the step of:

validating proper list insertion by checking status fields in all list entries.

18. The method of claim 17, further comprising the step of:

constraining all list entries such that they all are stored within a corresponding size block of address space as addressable by said variant portion of said list entry next field.

19. An apparatus for list insertion in mixed bus environments, comprising:

a list entry next field processed so as to generate a portion of said list entry next field which has a fixed value for all list entries and a portion which is variant, wherein said variant portion of said list entry next field is scaled to match the width of a local bus cycle.

20. The apparatus of claim 19, wherein said list entries are constrained such that they all are stored in a same block of shared system memory, and wherein an update of a list entry next field is reduced to a single write operation that can be performed with a single atomic bus operation.

21. The apparatus of claim 19, wherein said list entry next field.

22. The apparatus of claim 21, wherein a high sub-part of said list entry next field in all list entries is pre-initialized to a common fixed value.

23. The apparatus of claim 19, further comprising:

a terminator list entry.

24. The apparatus of claim 23, wherein a new list entry is inserted just before said list terminator entry, and wherein said next field for all list additions ultimately links to said terminator list entry.

25. The apparatus of claim 24, further comprising a mechanism for checking the status of a list entry positioned just prior to said terminator list entry.

26. The apparatus of claim 21, wherein a low sub-part of said list entry next field in a last operative entry is written during a single bus cycle to establish a link to a new list entry.

27. The apparatus of claim 19, wherein proper list insertion is validated by checking status fields in all list entries.

* * * * *

UNITED STATES PATENT AND TRADEMARK OFFICE
CERTIFICATE OF CORRECTION

PATENT NO. : 5,911,054
DATED : June 9, 1999
INVENTOR(S) : Steven J. Jahr et al.

It is certified that error appears in the above-identified patent and that said Letters Patent is hereby corrected as shown below:

<u>Column 3,</u>
Line 27, after "list" insert -- entry --.

<u>Column 5,</u>
Lines 38-44, after "processed." delete "This invention may be generalized to list insertion in other environments by:
  Scaling the variant portion of the List Entry Next field, to match the local bus width; and
  Constraining all List Entries to reside within a corresponding size block of address space as addressable by the variant portion of the List Entry Next Field."

<u>Column 7,</u>
Line 21, after "field" insert -- is subdivided --

Signed and Sealed this

First Day of June, 2004

JON W. DUDAS
*Acting Director of the United States Patent and Trademark Office*